(12) United States Patent
Han et al.

(10) Patent No.: US 12,423,228 B2
(45) Date of Patent: Sep. 23, 2025

(54) BIT-PACKING METHOD FOR LIGHTENING NFA DATA STRUCTURE IN EXTENDED REGULAR EXPRESSION MATCHING PROCESS, APPARATUS AND COMPUTER PROGRAM FOR PERFORMING THE METHOD

(71) Applicant: UIF (University Industry Foundation), Yonsei University, Seoul (KR)

(72) Inventors: Yo-Sub Han, Seoul (KR); JoongHyuk Hahn, Seoul (KR); Sicheol Sung, Seoul (KR)

(73) Assignee: UIF (University Industry Foundation), Yonsei University, Seoul (KR)

( * ) Notice: Subject to any disclaimer, the term of this patent is extended or adjusted under 35 U.S.C. 154(b) by 427 days.

(21) Appl. No.: 18/061,849

(22) Filed: Dec. 5, 2022

(65) Prior Publication Data

US 2024/0134791 A1    Apr. 25, 2024
US 2024/0232076 A9    Jul. 11, 2024

(30) Foreign Application Priority Data

Oct. 21, 2022    (KR) .......................... 10-2022-0136486

(51) Int. Cl.
G06F 12/06      (2006.01)
(52) U.S. Cl.
CPC .. *G06F 12/0646* (2013.01); *G06F 2212/1056* (2013.01)

(58) Field of Classification Search
CPC .. G06F 12/04; G06F 12/0646; G06F 12/1056; G06F 16/22; G06F 16/90344; G06F 16/24568
See application file for complete search history.

(56) References Cited

U.S. PATENT DOCUMENTS

| | | | | |
|---|---|---|---|---|
| 6,601,026 B2* | 7/2003 | Appelt | ................ | G06F 16/313 707/E17.084 |
| 6,654,775 B1* | 11/2003 | Ott | ............................. | G06F 7/74 708/211 |
| 7,002,492 B2* | 2/2006 | Tsang | ................. | G11B 20/1426 341/59 |
| 7,068,192 B1* | 6/2006 | Dean | ....................... | H03M 7/40 707/999.1 |
| 7,099,881 B2* | 8/2006 | Richardson | ............. | H04L 45/54 707/706 |
| 8,593,310 B1* | 11/2013 | Zhang | ..................... | H03M 7/40 341/67 |

(Continued)

FOREIGN PATENT DOCUMENTS

| | | |
|---|---|---|
| KR | 10-1488615 B1 | 2/2015 |
| KR | 10-1645890 B1 | 8/2016 |

*Primary Examiner* — Lam T Mai
(74) *Attorney, Agent, or Firm* — BROADVIEW IP LAW, PC

(57) ABSTRACT

According to the exemplary embodiment of the present disclosure, according to a bit-packing method for lighting an NFA data structure during a process of matching an extended regular expression, an apparatus and a computer program for performing the same, the nondeterministic finite-state automation (NFA) is bit-packed to be stored during the process of matching the extended regular expression to efficiently store a huge amount of regular equation patterns.

12 Claims, 12 Drawing Sheets

(56) References Cited

U.S. PATENT DOCUMENTS

| | | | | |
|---|---|---|---|---|
| 8,725,749 B2* | 5/2014 | Horne | ............... | G06F 16/90344 707/756 |
| 9,304,703 B1* | 4/2016 | Ignomirello | ............ | H03M 7/55 |
| 9,558,299 B2* | 1/2017 | Yang | ................ | G06F 16/90344 |
| 9,563,399 B2 | 2/2017 | Goyal et al. | | |
| 2004/0111439 A1* | 6/2004 | Richardson | ....... | G06F 16/90344 |
| 2006/0007024 A1* | 1/2006 | Tsang | ................. | H04L 25/4908 341/50 |
| 2006/0195630 A1* | 8/2006 | Walters | ............... | G06F 9/30192 710/30 |
| 2007/0271305 A1* | 11/2007 | Chandrasekar | ......... | G06F 16/86 |
| 2008/0071802 A1* | 3/2008 | Lucco | ................. | G06F 40/143 |
| 2009/0064064 A1* | 3/2009 | Eisner | ................ | G06F 30/3323 716/106 |
| 2009/0085779 A1* | 4/2009 | Tsao | ........................ | H03M 5/14 341/50 |
| 2009/0115652 A1* | 5/2009 | Koabata | .................. | H03L 7/113 341/142 |
| 2009/0216513 A1* | 8/2009 | Pidan | .................. | G06F 30/3323 703/14 |
| 2010/0141486 A1* | 6/2010 | Su | ........................... | H03M 7/14 341/55 |
| 2014/0114996 A1* | 4/2014 | Ruehle | .................. | G06F 40/126 707/E17.014 |
| 2015/0135261 A1* | 5/2015 | Park | ...................... | H04L 63/102 726/4 |
| 2019/0114303 A1* | 4/2019 | Peloski | .................... | G06F 16/244 |
| 2019/0258641 A1* | 8/2019 | Peloski | .................... | G06F 16/289 |
| 2023/0092467 A1* | 3/2023 | Han | ........................ | G06N 5/01 706/48 |
| 2024/0345953 A1* | 10/2024 | Masud Rizavi | ....... | G11C 15/04 |

\* cited by examiner (a)

| 7 | 6 | 5 | 4 | 3 | 2 | 1 | 0 |
|---|---|---|---|---|---|---|---|
| 1 | ASCII code of beginning literal ||||||||
| 0 | ASCII code of ending literal ||||||||

(a)

| 7 | 6 | 5 | 4 | 3 | 2 | 1 | 0 |
|---|---|---|---|---|---|---|---|
| 0 | ASCII code of literal |||||||

| 7 | 6 | 5 | 4 | 3 | 2 | 1 | 0 |
|---|---|---|---|---|---|---|---|
| N | L | 0 | 0 | 1 | 1 | 1 | 1 |
| 1 | 0 | 0 | 0 | 0 | 0 | 0 | 0 |

(a)

| 7 | 6 | 5 | 4 | 3 | 2 | 1 | 0 |
|---|---|---|---|---|---|---|---|
| N | L | 0 | 0 | 1 | 1 | 1 | 1 |
| 1 | 1 | 0 | 0 | 0 | 0 | 0 | 0 |

| 7 | 6 | 5 | 4 | 3 | 2 | 1 | 0 |
|---|---|---|---|---|---|---|---|
| $N$ | $L$ | \multicolumn{2}{c|}{2} | \multicolumn{4}{c|}{Group number} |

(a)

| 7 | 6 | 5 | 4 | 3 | 2 | 1 | 0 |
|---|---|---|---|---|---|---|---|
| $N$ | $L$ | \multicolumn{2}{c|}{3} | \multicolumn{4}{c|}{Ref. number $\leq 9$} |

| 7 | 6 | 5 | 4 | 3 | 2 | 1 | 0 |
|---|---|---|---|---|---|---|---|
| \multicolumn{8}{c|}{$255 (= 2^8 - 1)$} |

FIG. 16

| 7 | 6 | 5 | 4 | 3 | 2 | 1 | 0 |
|---|---|---|---|---|---|---|---|
| 1 | Address $k$ |||||||
| 1 | Address $k$ (cont'd) |||||||

...

| 0 | 1 | Address $k$ (cont'd) ||||||

(a)

| 7 | 6 | 5 | 4 | 3 | 2 | 1 | 0 |
|---|---|---|---|---|---|---|---|
| 1 | Address $n$ |||||||
| 1 | Address $n$ (cont'd) |||||||

...

| 0 | 0 | Address $n$ (cont'd) ||||||

(b)

BIT-PACKING METHOD FOR LIGHTENING NFA DATA STRUCTURE IN EXTENDED REGULAR EXPRESSION MATCHING PROCESS, APPARATUS AND COMPUTER PROGRAM FOR PERFORMING THE METHOD

CROSS-REFERENCE TO RELATED APPLICATIONS

This application claims priority to and the benefit of Korean Patent Application No. 10-2022-0136486 filed in the Korean Intellectual Property Office on Oct. 21, 2022, the entire contents of which are incorporated herein by reference.

BACKGROUND

Field

The present patent application has been filed as research projects as described below.
[1] National Research Development Project Supporting the Present Invention
   Project Serial No. 1711152662
   Project No.: 2018-0-00276-005
   Department: Ministry of Science and ICT
   Project management (Professional) Institute: Institute of Information & Communication Technology Planning & Evaluation
   Research Project Name: Information & Communication Broadcasting Research Development Project
   Research Task Name: Automated malware-pattern ruleset generation based on deep learning (5/5)
   Contribution Ratio: 1/2
   Project Performing Institution: UIF (University Industry Foundation), Yonsei University
   Research Period: 2022.01.01-2022.12.31
[2] National Research Development Project supporting the Present Invention
   Project Serial No. 1711152718
   Project No.: 2020-0-01361-003
   Department: Ministry of Science and ICT
   Project management (Professional) Institute: Institute of Information & Communication Technology Planning & Evaluation
   Research Project Name: Information & Communication Broadcasting Research Development Project
   Research Task Name: Artificial Intelligence Graduate School Support Project (3/5)
   Contribution Ratio: 1/2
   Project Performing Institution: UIF (University Industry Foundation), Yonsei University
   Research Period: 2022.01.01-2022.12.31

The present disclosure relates to a bit-packing method for lightening an NFA data structure during an extended regular expression matching process, an apparatus and a computer program for performing the same, and more particularly, to a method, an apparatus, and a program for storing nondeterministic finite-state automation (NFA).

Description of the Related Art

The regular expression extends a grammar by utilizing concepts of captured groups, backreferencing, and lookahead to extend languages to be expressed.

cfsa2 considers only a literal label and expresses the literal label which frequently appears in each dictionary to have a shorter length to efficiently store it and proposes to separately store the information in the data structure.

YARA uses several regular expressions in one pattern and performs a logical operation therebetween, but does not support an extended grammar.

SUMMARY

An object to be achieved by the present disclosure is to provide a bit-packing method for lightening an NFA data structure in an extended regular expression matching process, an apparatus and a computer for performing the same to bit-pack and store nondeterministic finite-state automation (NFA) in an extended regular expression matching process.

Other and further objects of the present disclosure which are not specifically described can be further considered within the scope easily deduced from the following detailed description and the effect.

In order to achieve the above-described technical objects, according to an aspect of the present disclosure, a bit-packing method for lightening an NFA data structure in an extended regular expression matching process includes: generating a nondeterministic finite state automation (NFA) corresponding to an extended regular expression; and storing the nondeterministic finite state automation (NFA) according to a previously determined bit-packing reference.

Here, the storing is configured by storing each vertex of the nondeterministic finite automaton (NFA) in a continuous bit stream, configuring an intermediate vertex with a label and beginning addresses of vertexes adjacent to the intermediate vertex when the vertex is the intermediate vertex rather than a beginning vertex and an ending vertex, configuring the beginning vertex only with a beginning address of a vertex adjacent to the beginning vertex when the vertex is the beginning vertex, and configuring the vertex only with an end label when the vertex is the ending vertex, according to the bit-packing reference.

Here, the storing is configured by encoding a label using two most significant bits of a first byte as No-address (N-) flag and a Loop (L-) flag according to the bit-packing reference.

Here, the storing is configured by designating six least significant bits of the first byte by 000001, designating the most significant bit of a second byte by 0, according to the bit-packing reference, and encoding a literal label using seven unused bits of the second byte to write the ASCII code.

Here, the storing is configured by encoding an anchor label by designating third and fourth most significant bits of the first byte by 00 and four least significant bits of the first byte to one of six values of 0010 to 0111.

Here, the storing is configured by encoding a character class label by designating third and fourth most significant bits of the first byte by 01, using a fifth most significant bit of the first byte as Invert(I-) flag, using three least significant bits of the first byte to write a number n of range expressing in the character class, designating three least significant bits of the first byte by 0 when the number of range expressed in the character class exceeds 7 which is a maximum value expressed by three bits, and using a second byte to write the number n of range expressed in the character class, according to the bit-packing reference.

Here, the storing is configured by encoding a lookahead label by designating six least bits of the first byte by 000001, designating two most significant bits of the second byte by 10 when the vertex is a beginning vertex, and designating two most significant bits of the second byte by 11 and designating six least significant bits of the second byte by 000000 when the vertex is an ending vertex, according to the bit-packing reference.

Here, the storing is configured by encoding a capture group label by designating third and fourth most significant bits of the first byte by 10 and using four least significant bits of the first byte to write a group number, according to the bit-packing reference and encoding a backreferencing label by designating third and fourth most significant bits of the first byte by 11 and using four least significant bits of the first byte to write a reference number, according to the bit-packing reference.

Here, the storing is configured by encoding the end label by designating one byte in which all bits are 1, according to the bit-packing reference.

Here, the storing is configured by encoding an address by using one or more bytes to write one address, designating the most significant bit of the last byte for one address by 0, designating the most significant bit of bytes rather than the last byte for one address by 1, designating a second most significant bit of the last byte for an address of a final adjacent vertex to one vertex by 0, and designating a second most significant bit of a last byte for one address of a vertex which is not a final adjacent vertex to one vertex by 1, according to the bit-packing reference.

Here, the generating of a nondeterministic finite state automation (NFA) is configured by generating the nondeterministic finite state automaton (NFA) corresponding to the extended regular expression using a Glushkov automaton transformed such that trunk lines starting from one vertex have the same label.

In order to achieve the above-described technical objects, according to an aspect of the present disclosure, a computer program is stored in a computer readable storage medium to cause a computer to execute any one of the bit-packing methods for lightening an NFA data structure in an extended regular expression matching process.

In order to achieve the above-described technical objects, according to an aspect of the present disclosure, a bit-packing apparatus for lightening an NFA data structure in an extended regular expression matching process includes: a memory which stores one or more programs to bit-pack and store a nondeterministic finite state automaton (NFA) in an extended regular expression matching process; and one or more processors which perform an operation of bit-packing and storing a nondeterministic finite state automaton (NFA) in an extended regular expression matching process according to one or more programs stored in the memory. The processor is configured to generate a nondeterministic finite state automation (NFA) corresponding to an extended regular expression; and store the nondeterministic finite state automation (NFA) according to a previously determined bit-packing reference.

According to the exemplary embodiment of the present disclosure, according to a bit-packing method for lightening an NFA data structure in an extended regular expression matching process, an apparatus and a computer program for performing the same, the nondeterministic finite-state automation (NFA) is bit-packed to be stored in the extended regular expression matching process to efficiently store a huge amount of regular equation patterns.

The effects of the present invention are not limited to the technical effects mentioned above, and other effects which are not mentioned can be clearly understood by those skilled in the art from the following description

BRIEF DESCRIPTION OF THE DRAWINGS

FIG. 12 is a view for explaining a data structure expressing a range of a character set according to an exemplary embodiment;

FIG. 13 is a view for explaining a data structure expressing a lookahead label according to an exemplary embodiment;

FIG. 14 is a view for explaining a data structure expressing a captured group label and a backreferencing label according to an exemplary embodiment;

FIG. 15 is a view for explaining a data structure which expresses an end label according to an exemplary embodiment of the present disclosure; and FIG. 16 is a view for explaining a data structure expressing one address according to an exemplary embodiment of the present disclosure.

DETAILED DESCRIPTION OF THE EMBODIMENT

Figure 1:
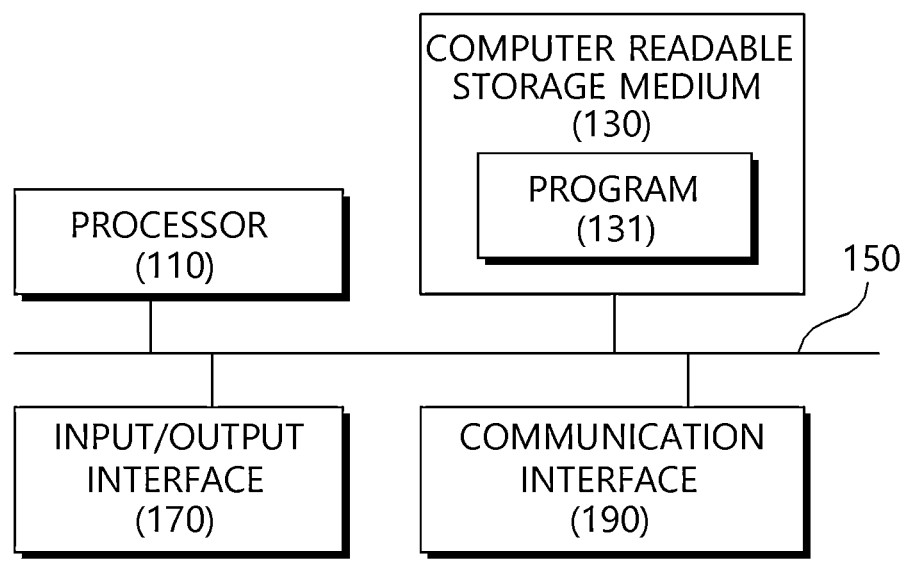
FIG. 1 is a block diagram for explaining a bit-packing apparatus for lightening an NFA data structure in an extended regular expression matching process according to an exemplary embodiment of the present disclosure.

Hereinafter, embodiments of the present disclosure will be described in detail with reference to the accompanying drawings. Advantages and characteristics of the present disclosure and a method of achieving the advantages and characteristics will be clear by referring to exemplary embodiments described below in detail together with the accompanying drawings. However, the present disclosure is not limited to exemplary embodiments disclosed herein but will be implemented in various different forms. The exemplary embodiments are provided by way of example only so that a person of ordinary skilled in the art can fully understand the disclosures of the present invention and the scope of the present invention. Therefore, the present invention will be defined only by the scope of the appended claims. Like reference numerals generally write like elements throughout the specification.

Unless otherwise defined, all terms (including technical and scientific terms) used in the present specification may be used as the meaning which may be commonly understood by the person with ordinary skill in the art, to which the present invention belongs. It will be further understood that terms defined in commonly used dictionaries should not be interpreted in an idealized or excessive sense unless expressly and specifically defined.

In the specification, the terms "first" or "second" are used to distinguish one component from the other component so that the scope should not be limited by these terms. For example, a first component may also be referred to as a second component and likewise, the second component may also be referred to as the first component.

In the present specification, in each step, numerical symbols (for example, a, b, and c) are used for the convenience of description, but do not explain the order of the steps so that unless the context apparently indicates a specific order, the order may be different from the order described in the specification. That is, the steps may be performed in the order as described or simultaneously, or an opposite order.

In this specification, the terms "have", "may have", "include", or "may include" represent the presence of the characteristic (for example, a numerical value, a function, an operation, or a component such as a part"), but do not exclude the presence of additional characteristic.

Hereinafter, exemplary embodiments of a bit-packing method for lightening an NFA data structure in an extended regular expression matching process according to the present disclosure, an apparatus and a computer program for performing the same will be described in detail with reference to the accompanying drawings.

First, a bit-packing apparatus for lightening an NFA data structure in an extended regular expression matching process according to an exemplary embodiment of the present disclosure will be described with reference to FIG. 1.

FIG. 1 is a block diagram for explaining a bit-packing apparatus for lighting an NFA data structure in an extended regular expression matching process according to an exemplary embodiment of the present disclosure.

Referring to FIG. 1, the bit-packing apparatus 100 for lightening an NFA data structure in an extended regular expression matching process according to an exemplary embodiment of the present disclosure (hereinafter, simply referred to as "bit-packing apparatus") bit-packs and stores the nondeterministic finite-state automaton (NFA) in an extended regular expression matching process.

By doing this, according to the present disclosure, a huge amount of regular expression patterns is efficiently stored.

To this end, the bit-packing apparatus 100 may include one or more processor 110, a computer readable storage medium 130, and a communication bus 150.

The processor 110 controls the bit-packing apparatus 100 to operate. For example, the processor 110 may execute one or more programs 131 stored in the computer readable storage medium 130. One or more programs 131 include one or more computer executable instructions and when the computer executable instruction is executed by the processor 110, the computer executable instruction may be configured to allow the bit-packing apparatus 100 to perform an operation for bit-packing and storing the nondeterministic finite-state automaton (NFA) in an extended regular expression matching process.

The computer readable storage medium 130 is configured to store a computer executable instruction or program code, program data and/or other appropriate format of information to bit-pack and store the nondeterministic finite-state automaton (NFA) in an extended regular expression matching process. The program 131 stored in the computer readable storage medium 130 includes a set of instructions executable by the processor 110. In one exemplary embodiment, the computer readable storage medium 130 may be a memory (a volatile memory such as a random access memory, a non-volatile memory, or an appropriate combination thereof), one or more magnetic disk storage devices, optical disk storage devices, flash memory devices, and another format of storage mediums which is accessed by the bit-packing apparatus 100 and stores desired information, or an appropriate combination thereof.

The communication bus 150 interconnects various other components of the bit-packing apparatus 100 including the processor 110 and the computer readable storage medium 130 to each other.

The bit-packing apparatus 100 may include one or more input/output interfaces 170 and one or more communication interfaces 190 which provide an interface for one or more input/output devices. The input/output interface 170 and the communication interface 190 are connected to the communication bus 150. The input/output device (not illustrated) may be connected to the other components of the bit-packing apparatus 100 by means of the input/output interface 170.

Now, a bit-packing method for lightening an NFA data structure in an extended regular expression matching process according to an exemplary embodiment of the present disclosure will be described with reference to FIG. 2.

Figure 2:
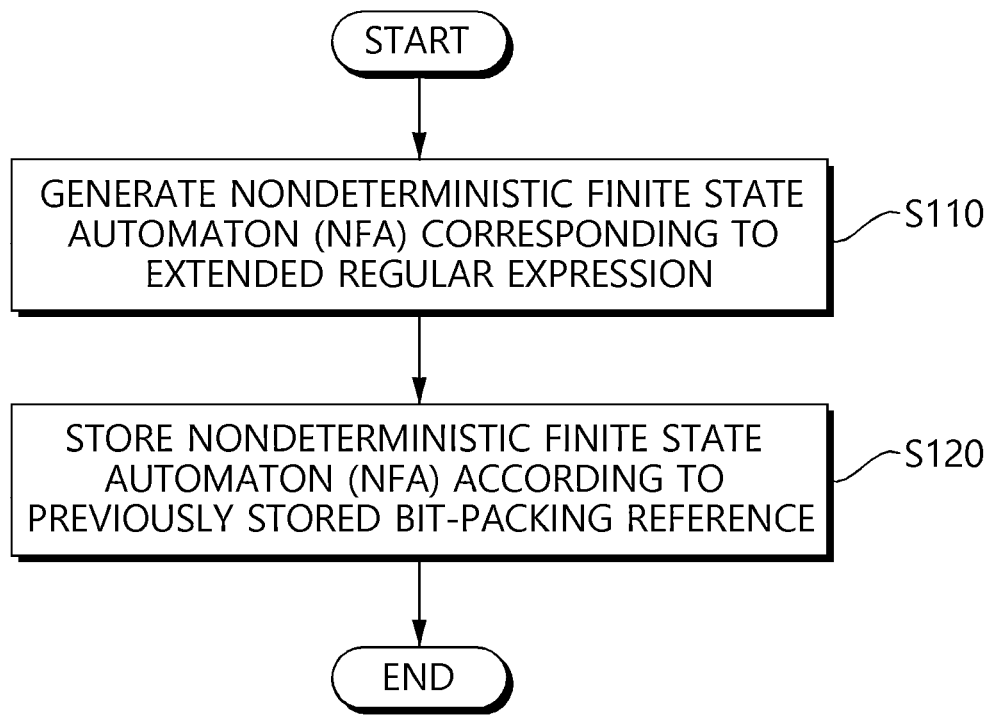
FIG. 2 is a flowchart for explaining a bit-packing method for lightening an NFA data structure in an extended regular expression matching process according to an exemplary embodiment of the present disclosure.

FIG. 2 is a flowchart for explaining a bit-packing method for lighting an NFA data structure in an extended regular expression matching process according to an exemplary embodiment of the present disclosure.

Referring to FIG. 2, the processor 110 of the bit-packing apparatus 110 may generate a nondeterministic finite-state automaton (NFA) corresponding to the extended regular expression in step S110.

At this time, the processor 110 generates a nondeterministic finite automaton (NFA) corresponding to an extended regular expression using a Glushkov automaton transformed such that all trunk lines starting from one vertex have the same label.

Thereafter, the processor 110 stores the nondeterministic finite automaton (NFA) according to a previously stored bit-packing reference in step S120.

That is, the processor 110 stores each vertex of the nondeterministic finite automaton (NFA) in a continuous bit stream according to the bit-packing reference.

At this time, when the vertex is an intermediate vertex, rather than a beginning vertex and an ending vertex, the processor 110 configures the intermediate vertex with beginning addresses of a vertex adjacent to the intermediate vertex.

When the vertex is a beginning vertex, the processor 110 configures the beginning vertex only with a beginning address of a vertex adjacent to the beginning vertex.

When the vertex is an ending vertex, the processor 110 configures the vertex only with an end label.

To be more specific, the processor 110 encodes a label using two most significant bits of a first byte as No-address (N-) flag and a Loop (L-) flag according to the bit-packing reference.

The processor 110 encodes a literal label by designating six least significant bits of the first byte by 000001 and designates the most significant bit of a second byte by 0 and using seven unused bits of the second byte to write the ASCII code, according to the bit-packing reference.

The processor 110 encodes an anchor label by designating third and fourth most significant bits of the first byte by 00 and four least significant bits of the first byte to one of six values of 0010 by 0111, according to the bit-packing reference.

The processor 110 encodes a character class label by designating third and fourth most significant bits of the first byte by 01, using a fifth most significant bit of the first byte as Invert(I-) flag, and using three least significant bits of the first byte to write a number n of range expressing in the character class, according to the bit-packing reference. At this time, when the number of range expressed in the character class exceeds 7 which is a maximum value expressed by three bits, the processor 110 designates three least significant bits of the first byte by 0 and uses a second byte to write the number n of range expressed in the character class.

The processor 110 designates six least bits of the first byte by 000001 according to the bit-packing reference. When the vertex is a beginning vertex, the processor 110 designates two most significant bits of the second byte by 10 and when the vertex is an ending vertex, designates two most significant bits of the second byte by 11 and designates six least significant bits of the second byte by 000000 to encode a lookahead label.

Further, the processor 110 encodes a captured group label by designating third and fourth most significant bits of the first byte by 10 and using four least significant bits of the first byte to write a group number according to the bit-packing reference.

Further, the processor 110 encodes a backreferencing label by designating third and fourth most significant bits of the first byte by 11 and using four least significant bits of the first byte to write a reference number, according to the bit-packing reference.

The processor 110 encodes the end label by designating one byte in which all bits are 1, according to the bit-packing reference.

The processor 110 encodes an address by using one or more bytes to write one address, designating the most significant bit of the last byte for one address by 0, and designating the most significant bit of bytes rather than the last byte for one address by 1, according to the bit-packing reference. At this time, the processor 110 designates a second most significant bit of the last byte for an address of a final adjacent vertex to one vertex by 0 and designates a second most significant bit of a last byte for one address of a vertex which is not a final adjacent vertex to one vertex by 1.

Now, a bit-packing method for lightening an NFA data structure in an extended regular expression matching process according to an exemplary embodiment of the present disclosure will be described in more detail with reference to FIGS. 3 to 16.

A regular expression patter refers to a pattern of a character stream expressed by a regular expression (regex) or an extended regular expression. At this time, the extended regular expression includes a grammar of a non-extended regular expression and further includes a grammar such as lookahead or backreferencing. This allows the extended regular expression to express languages beyond the regular languages and to handle more various types of patterns.

A regular expression engine is used to confirm whether the regular expression pattern matches a character stream and is configured by an NFA generating process of creating a nondeterministic finite automaton NFA corresponding to a regular equation pattern and a matching process of confirming whether there is an accept path for a character stream in the NFA.

According to the present disclosure, the nondeterministic finite automaton NFA of the extended regular expression which is generated as an intermediate result of the regular expression engine is efficiently stored. To this end, according to the present disclosure, the bit-packing technique which uses a minimum space to store each information is utilized. As a result, according to the present disclosure, a huge amount of regular equation patterns is efficiently stored and the regular equation engine may perform the pattern matching using the same.

1. Background

An arbitrary character $\sigma$ is a regular expression and with respect to the regular expressions r1 and r2, (r1r2), (r1|r2), (r1*) are regular expressions. A language L(r) represented by the regular expression r is defined by (1) $L(\sigma)=\{\sigma\}$, (2) $L(r_1r_2)=L(r_1)L(r_2)$, (3) $L(r_1|r_2)=L(r_1) \cap L(r_2)$, (4) $L(r_1*)=L(r_1)*$. The regular expression defined as described above extends a grammar by utilizing concepts of captured groups, backreferencing, and lookahead to extend languages to be expressed.

As the regular expression is used, the regular expression will be referred to as a regular equation pattern or a pattern in the following description. The pattern may be used to identify the matching with the entire given character stream or a partial character stream.

A. Captured Group and Backreference

The captured group $(_n)_n$ and the backreference \n are used to reuse a partial character stream matching a part of the pattern. The captured group stores the partial character stream matching the regular expression in the group and the backreference matching the stored partial character stream in the captured group.

When it is confirmed whether a character stream <head><\head> matches the pattern $R_1=<(_1head|body)1>$ <\1>, the captured group (1)1 confirms that a front partial character stream head of <head></head> matches head|body and stores the corresponding partial character stream head. The backreference \1 confirms that a rear partial character stream "head" of the character stream <head></head> by referring the head stored by the captured group $(_1)_1$. Accordingly, the character stream <head></head> matches the entire pattern R and the character stream <body></body> matches as well for the similar reason. However, in the character stream <head></body> or <body></head>, a partial character stream (body and head, respectively) that attempts the matching with the partial characteristic (head and body, respectively) each referenced in the backreference is different and does not match the pattern R.

B. Lookahead

The lookahead (?=r) confirms whether a front part of a character stream to come out matches a pattern r in the lookahead and at this time, does not consider a part that is confirmed only to match the lookahead as a part of the character stream which matches the entire pattern. For example, in the pattern $R_2$=apple(?tea), (?=tea) corresponds to the lookahead and the pattern inside is tea. When it is confirmed whether there is a partial character stream matching the pattern $R_2$ with respect to apple tea, it is confirmed that "apple" of the pattern $R_2$ matches "apple" corresponding to the front part of the entire character stream. Thereafter, it is confirmed whether a front part of "tea" which is a remaining character stream excluding "apple" from the entire character stream matches a pattern tea corresponding to the lookahead (?=tea) of $R_2$. "tea" of the character stream matches only in the lookahead, which is not considered as a part of the pattern. Accordingly, the pattern R2 matches "apple" of the partial character stream of the character stream "apple tea". In comparison with this, in the case of the character stream "apple pie" or "apple tree", the partial character streams "pie" and "tree" do not match the pattern of the lookahead and these character streams do not include any of partial character streams matching the pattern $R_2$.

C. Anchor

The anchor is used to designate the position in the character stream, rather than the character. The anchor includes six types of ^, $, \A, \Z, \b, \B, which mean the beginning of a line, the end of the line, the beginning of a character stream, the end of the character stream, a word boundary (between a space character and a non-space character), and a position which is not a word boundary in this order. For example, a pattern $R_3$=\bapple matches "apple" of the partial character stream of the character stream "red apple", but does not match any of the partial character stream of the character stream "pineapple".

D. Character Class

The character class is a method for simply writing a pattern matching two or more characters. For example, a range of characters is expressed by listing characters in square brackets or using a hyphen (-) and a complement set is expressed using a caret ^. For example, the character class [^A-Za-z0-9] matches all characters excluding one English capital and small letter or numbers corresponding to 0 to 9. A frequently used character class is expressed by one backslash \ and English letters. For example, \d is equal to the character class [0-9] corresponding to numbers.

The captured group and the lookahead are referred to as extended grammars and a regular expression including the captured group and the lookahead is referred to as an extended regular expression. Most of the regular expression engine supports a grammar which uses the extended regular expression, an anchor, and a character class. According to the present disclosure, a nondeterministic finite automaton (NFA) for a pattern is generated to efficiently store the regular expression and efficiently stored by the bit-packing technique. A data structure for generating a nondeterministic finite automaton (NFA) for a regular expression pattern and storing the generated nondeterministic finite automaton (NFA) which is the main idea of the present disclosure will be described.

2. NFA Generating Process

Figure 3:
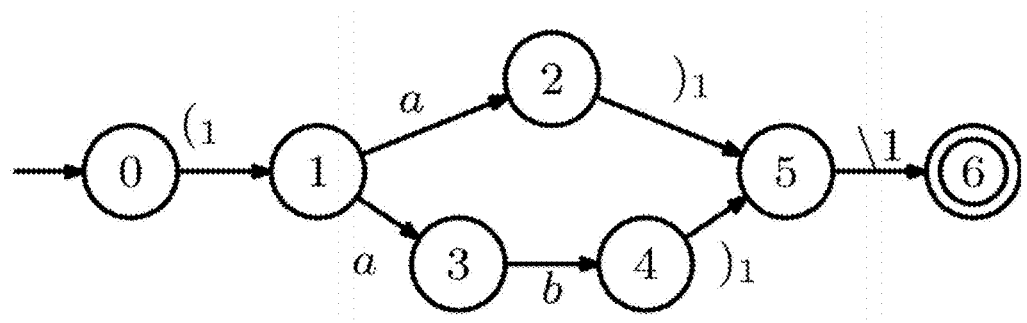
FIG. 3 is a view illustrating an example of a Glushkov automaton when an extended grammar is included.
Figure 4:
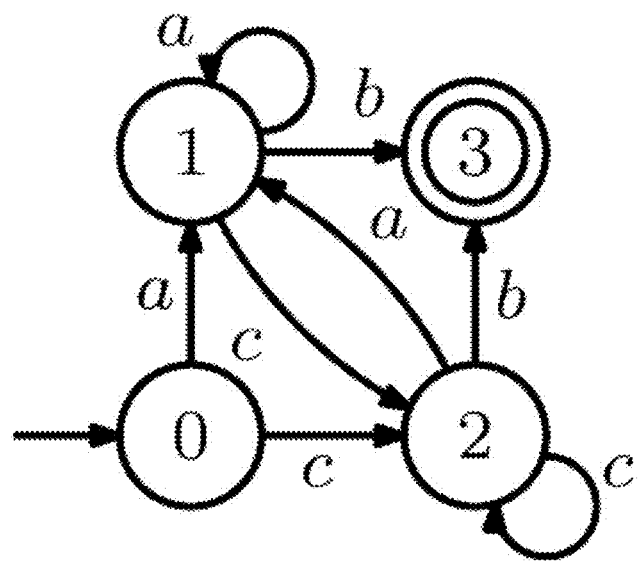
FIG. 4 is a view illustrating an example of a Glushkov automaton when an extended grammar is not included.
Figure 5:
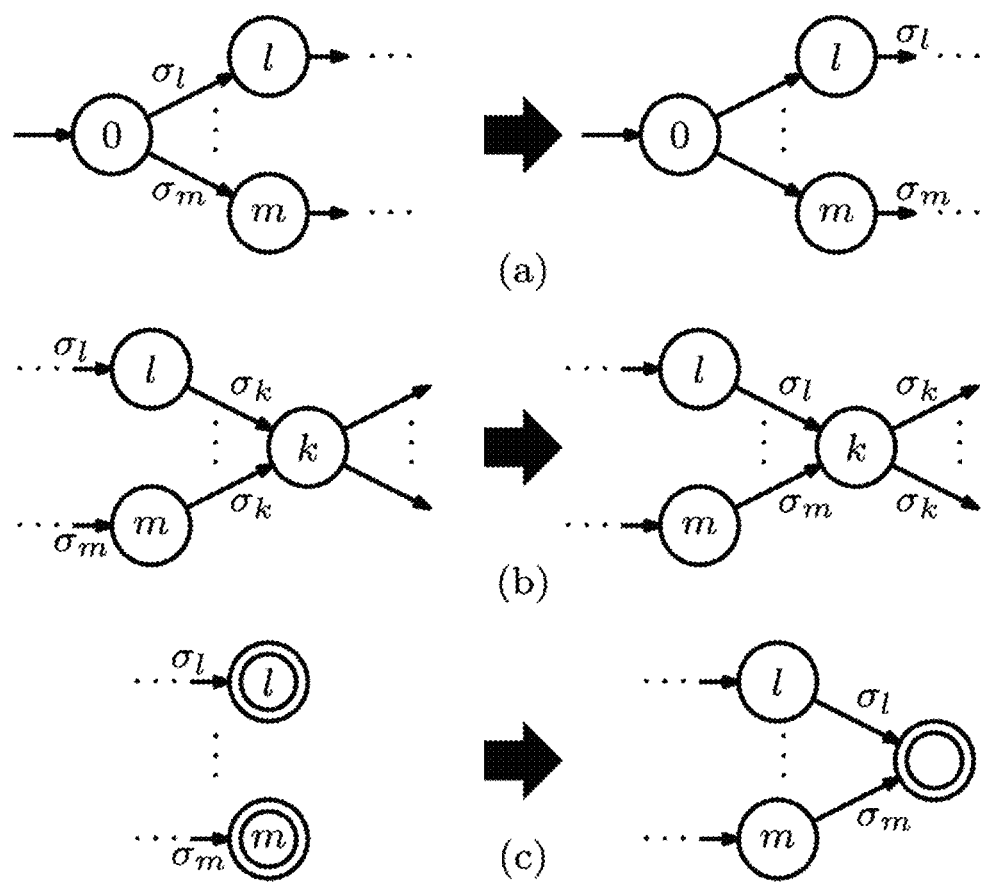
FIG. 5 is a view for explaining a process of transforming Glushkov automaton according to an exemplary embodiment of the present disclosure.
Figure 6:
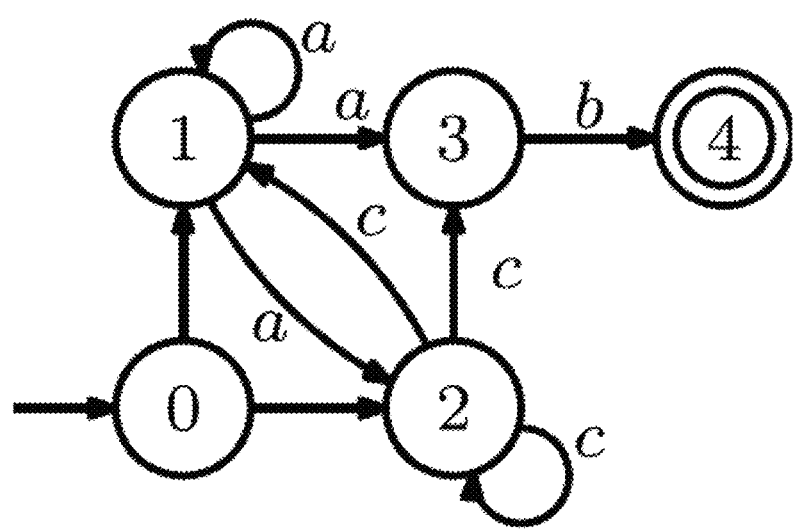
FIG. 6 is a view illustrating a Glushkov automaton obtained by transforming Glushkov automaton illustrated in FIG. 4 according to the present disclosure.

FIG. 3 is a view illustrating an example of a Glushkov automaton when an extended grammar is included; FIG. 4 is a view illustrating an example of a Glushkov automaton when an extended grammar is not included, FIG. 5 is a view for explaining a process of transforming Glushkov automaton according to an exemplary embodiment of the present disclosure in which FIG. 5A illustrates a transformation for a start vertex, FIG. 5B illustrates a transformation for a vertex k, and FIG. 5C illustrates a transformation for an end vertex, FIG. 6 is a view illustrating a Glushkov automaton obtained by transforming Glushkov automaton illustrated in FIG. 4 according to the present disclosure;

In the NFA generating process, the regular equation pattern may be transformed into the nondeterministic finite automaton (NFA) by the following process.

The regular expression engine may generate a nondeterministic finite automaton NFA configured by (1) one beginning vertex, (2) one or more ending vertexes, and (3) a nondeterministic finite automaton (NFA) configured by a directional trunk line which connects each vertex from the input pattern. At this time, there may be no directional trunk line or two or more directional trunk lines with respect to one vertex, which are distinguished with different labels. When a vertex 1 is adjacent to the vertex k, it means that there is the trunk line directed to the vertex 1 from the vertex k.

Thomson or Glushkov construction algorithm may be used for the nondeterministic finite automaton NFA with respect to the given regular pattern and the nondeterministic finite automaton generated by the Glushkov construction is referred to as Glushkov automaton. In the present disclosure, Glushkov automaton is generated for a given pattern and this is because the nondeterministic finite automaton NFA has a less number of vertexes than that of a case in which the Thompson construction is used. This characteristic is suitable for saving a space resource which is an object of the present disclosure. FIGS. 3 and 4 illustrate a Glushkov automaton for the regular expression pattern (a|c)*b which does not include extended regular expression $(_1a|ab)_1$\1 and the extended grammar.

In FIG. 4, it should be noted that the trunk line directed to one vertex has the same label (for example, all trunk lines directed to the vertex 1 have a label a). The Glushkov automaton always has this property. In order to apply the data structure proposed by the present disclosure, according to the present disclosure, as illustrated in FIGS. 5 and 6, the Glushkov automaton transformed to allow the trunk lines starting from one vertex have the same label may be used. For example, referring to FIG. 6, all the trunk lines starting from the vertex 1 has "a" as a label.

The generated nondeterministic finite automaton (NFA) is used by the regular expression engine to perform the matching of the pattern and to this end, the Thompson or a Spencer matching algorithm may be used. The present disclosure does not relate to the specific process of confirming the pattern matching by the nondeterministic finite automaton NFA, so that the detailed description of the process of confirming pattern matching will be omitted. In the next section, a method for expressing the nondeterministic finite automaton NFA including the extended grammar and a data structure proposed by the present disclosure will be described.

3. NFA Storing Process

Figure 7:
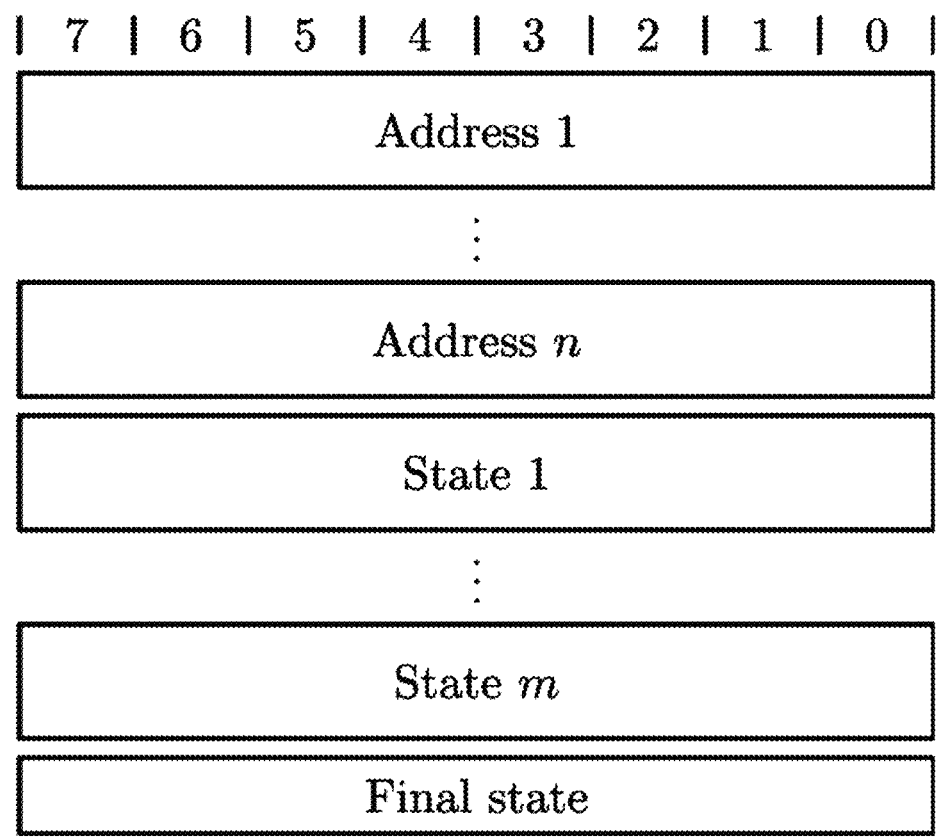
FIG. 7 is a view for explaining a data structure for storing a nondeterministic finite automaton (NFA) according to an exemplary embodiment of the present disclosure.
Figure 8:
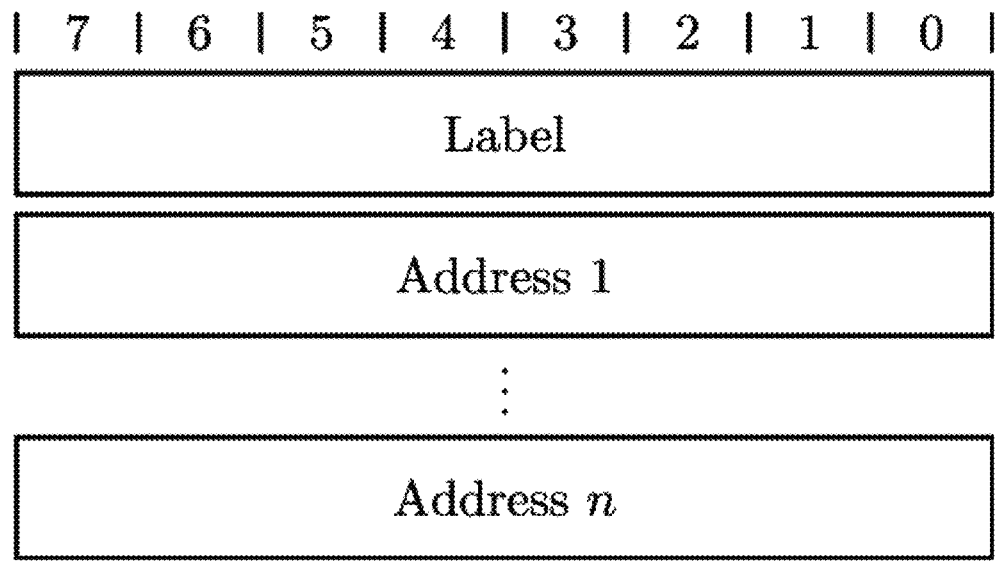
FIG. 8 is a view for explaining a data structure which expresses one vertex according to an exemplary embodiment of the present disclosure.

FIG. 7 is a view for explaining a data structure for storing a nondeterministic finite automaton (NFA) according to an exemplary embodiment of the present disclosure and FIG. 8 is a view for explaining a data structure which expresses one vertex according to an exemplary embodiment of the present disclosure.

In the NFA storing process, the nondeterministic finite automaton NFA generated from the regular expression pattern is stored as follows:

The present disclosure proposes a data structure which efficiently stores the transformed Glushkov automaton.

As illustrated in FIG. 7, the data structure according to the present disclosure uses a bit-packing manner which stores the transformed Glushkov automaton in a series of continuous bits and each vertex of the automaton is stored in a continuous bit stream. Here, in FIG. 7, n represents a number of vertexes adjacent to the beginning vertex and m represents (the number of all vertexes)−2.

Here, as illustrated in FIG. 8, each vertex may be configured by 1) label and 2) beginning addresses of vertexes adjacent to the vertex. Exceptionally, the starting vertex may be configured only with the beginning address of an adjacent vertex and the ending vertex may be configured only with the end label. Here, n illustrated in FIG. 8 represents a number of adjacent vertexes.

A. Label Encoding

One byte refers to eight bits. Two most significant bits of the first byte may be used as No-address(N-) and loop(L-) flags. When all bytes corresponding to the beginning position of the label encoding are configured by 0, it may be ignorable. That is, label encoding configured by two bytes of 00000000 and 00110011 and one-byte label encoding configured by 00110011 may have the same meaning.

N-Flag and L-Flag

N-flag indicates that a vertex 1 adjacent to the corresponding vertex k is unique and the beginning address of k is located immediately after the bit stream representing 1. In this case, the address encoding indicating the beginning address of q may be omitted. By doing this, the space cost for the regular expression (for example gr[ae]y) representing a simple list of characters or a character class may be saved.

L-flag indicates that the vertex k is adjacent thereto. That is, it means that the vertex has a trunk line directed to itself. Accordingly, unlike the other vertex adjacent to the vertex k, k does not perform the address encoding by itself, but may be represented by means of the L-flag. By doing this, the space cost for a regular expression (for example, matching \s*, an empty character stream or one or more space character) which repeats one character or a character class may be saved.

Literal

Figure 9:
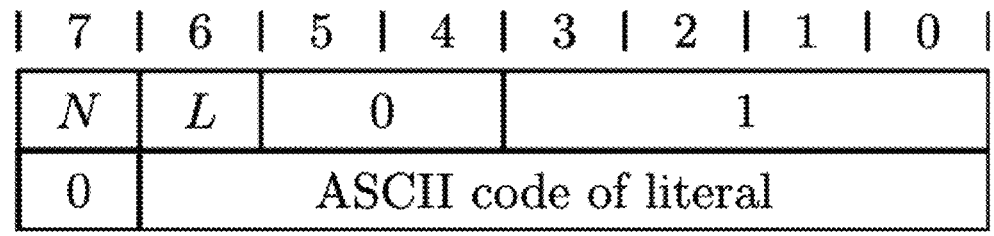
FIG. 9 is a view for explaining a data structure expressing a literal label according to an exemplary embodiment of the present disclosure.

FIG. 9 is a view for explaining a data structure which expresses a literal label according to an exemplary embodiment of the present disclosure.

ASCII characters refer to 128 characters represented by 7-25 bit encoding and the literal may be used to express the ASCII characters. Referring to FIG. 9, six least significant bits of the first byte of the label are designated by 000001 and a most significant bit of the second byte is designated by 0 so that it means that the vertex indicates the literal (referring that two most significant bits of the first byte corresponds to N- and L-flags). Seven unused bits of the second byte are used to write the ASCII code (for example, ASCII code 65 for English capital letter A, bit notation: 100001).

Figure 10:
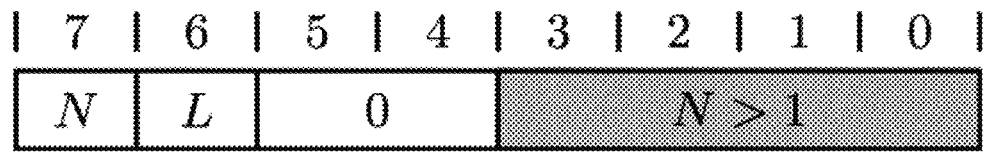
FIG. 10 is a view for explaining a data structure expressing an anchor label according to an exemplary embodiment of the present disclosure.

Anchor:

FIG. 10 is a view for explaining a data structure which expresses an anchor label according to an exemplary embodiment of the present disclosure.

Referring to FIG. 10, first and fourth most significant bits (same as the literal label) of the first byte of the label are designated by 00 and four least significant bits are designated by one of six values of 2 to 7 (bit notation 0010 to 0111) so that it means that the vertex sequentially represents an anchor, that is, ^, $, \A, \Z, \b, \B, in this order from a case that four least significant bits are 2. When four least significant bits are 8 to 15 (bit notations 0010 to 0111), the anchor is not used.

Here, N illustrated in FIG. 10 indicates one of 2 to 7.

Character Class

Figure 11:
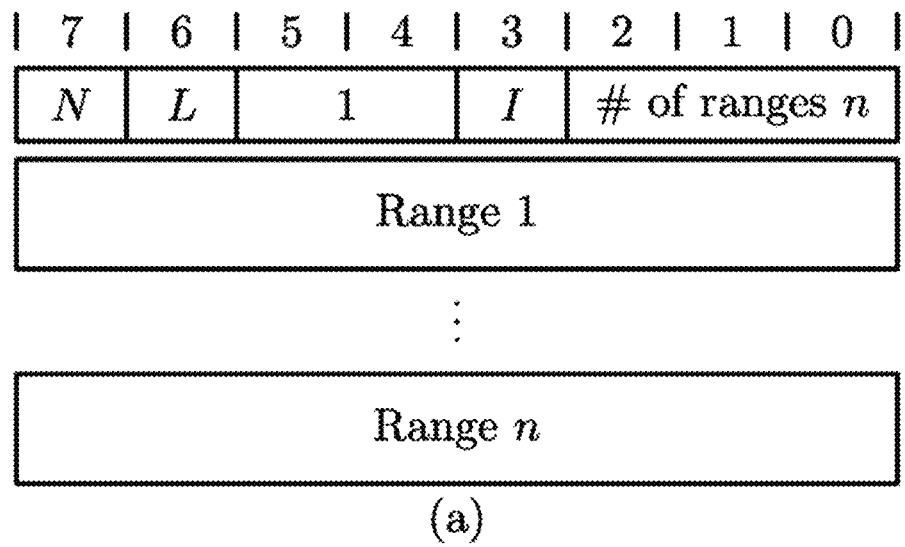
FIG. 11 is a view for explaining a data structure expressing a character class label according to an exemplary embodiment of the present disclosure.
Figure 11:
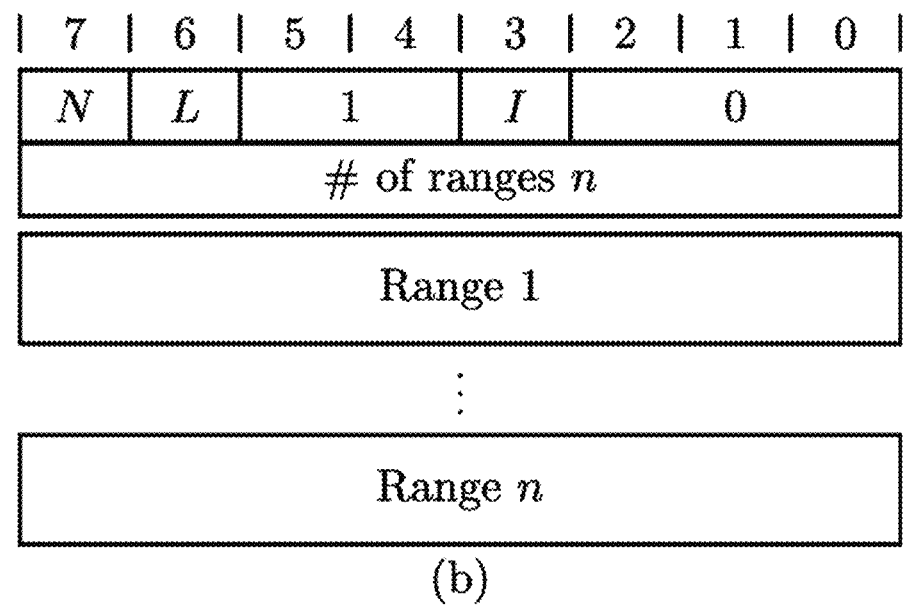

FIG. 11 is a view for explaining a data structure which expresses a character class label according to an exemplary embodiment of the present disclosure in which FIG. 11A illustrates a case where a number n of range is equal to or lower than 7 and FIG. 11B illustrates a case where a number of range exceeds 7. FIG. 12 is a view for explaining a data structure expressing a range of a character class according to an exemplary embodiment in which FIG. 12A illustrates a case where the range is written by a minimum value and a maximum value and FIG. 12B illustrates a case where the range is written by a single character.

Referring to FIG. 11, it means that third and fourth most significant bits of the first byte of the label are designated by 01 so that it means that the vertex indicates a character class. Three least significant bits refer to a number n of ranges represented by the character class. When the number of ranges represented by the character class exceeds 7 which is the maximum value represented by three bits, three least significant bits are designated by 0 and a number of ranges may be written in the second byte. A fourth most significant bit indicates an Invert(I-) flag, which means that the character class is a complement set of a set indicated by the range.

Thereafter, a minimum n to maximum 2n bytes may represent n ranges of the character class. Each range may be configured by a minimum value and a maximum value as illustrated in FIG. 12A or by one character as illustrated in FIG. 12B. When the range is configured by the minimum value and the maximum value, the range is written by one byte starting with bit 1 and one byte starting with 0 and when the range is configured by one character, the range is written by one byte starting with bit 0.

Lookahead

FIG. 13 is a view for explaining a data structure expressing a lookahead label according to an exemplary embodiment in which FIG. 13A illustrates a case of expressing a beginning label and FIG. 13B illustrates a case of expressing an end label.

Referring to FIG. 13, six least significant bits (equal to a literal label) of a first byte of the label is designated by 000001, two most significant bits of a second byte are designated by 10 so that it means that the vertex indicates the beginning of the lookahead and two most significant bits of the second byte are designated by 11 so that it means that the vertex indicates the end of the lookahead.

Six least significant bits of the second byte are represented by 00000 and a value other than 00000 is used for extension of the regular equation (for example, negative-), lookahead, lookbehind, or negative lookbehind which have not been described in the present disclosure.

Capture Group and Backreferencing

FIG. 14 is a view for explaining a data structure expressing a capture group label and a backreferencing label according to an exemplary embodiment in which FIG. 14A illustrates a case of expressing a capture group label and FIG. 14B illustrates a case of expressing a backreferencing label.

Referring to FIG. 14, it means that third and fourth most significant bits of the first byte of the label are designated by 10 or 11 so that it means that the vertex indicates a capture group or backreferencing. Four least significant bits refer to a group number (or corresponding reference numeral). It does not distinguish between the start and end of the capture group. It is assumed that during the operation of the engine, the start of the capture group is identified by an odd-numbered visit of the capture group having the same grout number and the end is identified by the even-numbered visit.

End Label

FIG. 15 is a view for explaining a data structure which expresses an end label according to an exemplary embodiment of the present disclosure.

Referring to FIG. 15, a special label for expressing one ending vertex generated by the Glushkov construction algorithm may be represented by one byte in which all bits are 1. It also means the end of the data structure.

B. Address Encoding

FIG. 16 is a view for explaining a data structure expressing one address according to an exemplary embodiment of the present disclosure in which FIG. 16A illustrates a case where it is not an address of a last adjacent vertex for one vertex and 16B illustrates a case where it is an address of a last adjacent vertex for one vertex.

When an N-flag of the label encoding of the vertex is 0, a byte of a predetermined region may represent a beginning address of n vertexes adjacent to the corresponding vertex after the label encoding. Referring to FIG. 16, each address is configured by one or more bytes and in order to identify the byte indicating different addresses, a most significant bit of the last byte for one address has a value 0 and a most significant bit of the remaining byte has a value 1. Further, in order to identify the address of the last adjacent vertex to one vertex, a second most significant bit of the last byte for one address may be a value 0, and if not, it has a value 1. The other areas (seven, when it is the last byte for each address has six least significant bits) may be used to write an actual address.

The operation according to the exemplary embodiment of the present disclosure may be implemented as a program instruction which may be executed by various computers to be recorded in a computer readable storage medium. The computer readable storage medium indicates an arbitrary medium which participates to provide a command to a processor for execution. The computer readable storage medium may include solely a program command, a data file, and a data structure or a combination thereof. For example, the computer readable medium may include a magnetic medium, an optical recording medium, and a memory. The computer program may be distributed on a networked computer system so that the computer readable code may be stored and executed in a distributed manner. Functional programs, codes, and code segments for implementing the present embodiment may be easily inferred by programmers in the art to which this embodiment belongs.

The present embodiments are provided to explain the technical spirit of the present embodiment and the scope of the technical spirit of the present embodiment is not limited by these embodiments. The protection scope of the present embodiments should be interpreted based on the following appended claims and it should be appreciated that all technical spirits included within a range equivalent thereto are included in the protection scope of the present embodiments.

What is claimed is:

1. A bit-packing method for lightening a nondeterministic finite state automation (NFA) data structure in an extended regular expression matching process, comprising:

generating a nondeterministic finite state automation (NFA) corresponding to an extended regular expression; and storing the nondeterministic finite state automation (NFA) according to a previously determined bit-packing reference, wherein the generating of a nondeterministic finite state automation (NFA) is configured by generating the nondeterministic finite state automaton (NFA) corresponding to the extended regular expression using a Glushkov automaton transformed such that trunk lines starting from one vertex have the same label.

2. The bit-packing method according to claim 1, wherein the storing is configured by storing each vertex of the nondeterministic finite automaton (NFA) in a continuous bit stream, configuring an intermediate vertex with a label and beginning addresses of vertexes adjacent to the intermediate vertex when the vertex is the intermediate vertex rather than a beginning vertex and an ending vertex, configuring the beginning vertex only with a beginning address of a vertex adjacent to the beginning vertex when the vertex is the beginning vertex, and configuring the vertex only with an end label when the vertex is the ending vertex, according to the bit-packing reference.

3. The bit-packing method according to claim 2, wherein the storing is configured by encoding a label using two most significant bits of a first byte as No-address (N-) flag and a Loop (L-) flag according to the bit-packing reference.

4. The bit-packing method according to claim 3, wherein the storing is configured by designating six least significant bits of the first byte by 000001, designating the most significant bit of a second byte by 0, according to the bit-packing reference, and encoding a literal label using seven unused bits of the second byte to write the ASCII code.

5. The bit-packing method according to claim 4, wherein the storing is configured by encoding an anchor label by designating third and fourth most significant bits of the first byte by 00 and four least significant bits of the first byte to one of six values of 0010 by 0111.

6. The bit-packing method according to claim 5, wherein the storing is configured by encoding a character class label by designating third and fourth most significant bits of the first byte by 01, using a fifth most significant bit of the first byte as Invert (I-) flag, using three least significant bits of the first byte to write a number n of range expressing in the character class, designating three least significant bits of the first byte by 0 when the number of range expressed in the character class exceeds 7 which is a maximum value expressed by three bits, and using a second byte to write the number n of range expressed in the character class, according to the bit-packing reference.

7. The bit-packing method according to claim 6, wherein the storing is configured by encoding a lookahead label by designating six least bits of the first byte by 000001, designating two most significant bits of the second byte by 10 when the vertex is a beginning vertex, and designating two most significant bits of the second byte by 11 and designating six least significant bits of the second byte by 000000 when the vertex is an ending vertex, according to the bit-packing reference.

8. The bit-packing method according to claim 7, wherein the storing is configured by encoding a capture group label by designating third and fourth most significant bits of the first byte by 10 and using four least significant bits of the first byte to write a group number, according to the bit-packing reference and encoding a backreferencing label by designating third and fourth most significant bits of the first byte by 11 and using four least significant bits of the first byte to write a reference number, according to the bit-packing reference.

9. The bit-packing method according to claim 8, wherein the storing is configured by encoding the end label by designating one byte in which all bits are 1, according to the bit-packing reference.

10. The bit-packing method according to claim 9, wherein the storing is configured by encoding an address by using one or more bytes to write one address, designating the most significant bit of the last byte for one address by 0, designating the most significant bit of bytes rather than the last byte for one address by 1, designating a second most significant bit of the last byte for an address of a final adjacent vertex to one vertex by 0, and designating a second most significant bit of a last byte for one address of a vertex which is not a final adjacent vertex to one vertex by 1, according to the bit-packing reference.

11. A computer program stored in a non-transitory computer readable storage medium to allow a computer to execute the bit-packing method for lightening an NFA data structure in an extended regular expression matching process according to claim 1.

12. A bit-packing apparatus for lightening a nondeterministic finite state automation (NFA) data structure in an extended regular expression matching process, comprising:

a memory which stores one or more programs to bit-pack and store the nondeterministic finite state automaton (NFA) in an extended regular expression matching process; and one or more processors which perform an operation of bit-packing and storing the nondeterministic finite state automaton (NFA) in an extended regular expression matching process according to one or more programs stored in the memory, wherein the processor is configured to generate a nondeterministic finite state automation (NFA) corresponding to an extended regular expression; and store the nondeterministic finite state automation (NFA) according to a previously determined bit-packing reference, wherein the processor is configured by generating the nondeterministic finite state automaton (NFA) corresponding to the extended regular expression using a Glushkov automaton transformed such that trunk lines starting from one vertex have the same label.

* * * * *